US00RE40693E

(19) United States
(12) Reissued Patent
Browning et al.

(10) Patent Number: US RE40,693 E
(45) Date of Reissued Patent: Mar. 31, 2009

(54) METHOD AND APPARATUS FOR CREATING A WIREFRAME AND POLYGON VIRTUAL WORLD

(75) Inventors: Dan D. Browning, San Francisco, CA (US); Ethan D. Joffe, Venice, CA (US); Jaron Z. Lanier, Sausalito, CA (US)

(73) Assignee: Sun Microsystems, Inc., Santa Clara, CA (US)

(21) Appl. No.: 09/159,509

(22) Filed: Sep. 23, 1998

(Under 37 CFR 1.47)

Related U.S. Patent Documents

Reissue of:
(64) Patent No.: 5,559,995
Issued: Sep. 24, 1996
Appl. No.: 07/939,834
Filed: Sep. 2, 1992

U.S. Applications:
(63) Continuation of application No. 07/621,474, filed on Nov. 30, 1990, now abandoned.

(51) Int. Cl.
*G06T 17/00* (2006.01)

(52) U.S. Cl. ..... 707/1; 707/102; 707/104.1; 345/419; 345/581; 345/619

(58) Field of Classification Search ..... 707/1, 707/102, 104.1; 345/419, 581, 619, 653, 345/659, 679, 433
See application file for complete search history.

(56) References Cited

U.S. PATENT DOCUMENTS 4,463,380 A * 7/1984 Hooks, Jr. ..... 348/580
4,645,459 A * 2/1987 Graf et al. ..... 434/43
4,807,158 A * 2/1989 Blanton et al. ..... 395/125
4,952,922 A * 8/1990 Griffin et al. ..... 395/121
5,021,976 A * 6/1991 Wexelblat et al. ..... 395/159
5,159,687 A * 10/1992 Richburg ..... 395/200
5,237,647 A * 8/1993 Roberts et al. ..... 395/119

OTHER PUBLICATIONS

Fisher et al., "Virtual Environment Display System", ACM 1986 Workshop on Interactive 3D Graphics, Oct. 23–24, 1986, Chapel Hill, North Carolina, pp. 1–11.*

* cited by examiner

*Primary Examiner*—William M. Treat
(74) *Attorney, Agent, or Firm*—Robert C Kowert; Meyertons, Hood, Kivlin, Kowert & Goetzel, P.C.

(57) ABSTRACT

A method and apparatus for creating virtual worlds wherein a user may begin with a database containing a limited pictorial representation of a desired virtual world and then edit the database to specify the remaining data needed to create the actual virtual world. In one embodiment of the present invention, a database containing a limited pictorial representation of a virtual world is communicated to a receiving unit, and a grouping unit collects various descriptions of the pictorial representation into selected groups. An attribute assigning unit then assigns attributes to the groups. The attributes may include group hierarchy, constraints of motion, color, texture or other features. The modified database is then communicated to a data coupling unit which couples real world data to the groups. Finally, a rendering unit renders the virtual world which looks and functions according to the specified attributes and the real world data.

42 Claims, 3 Drawing Sheets

METHOD AND APPARATUS FOR CREATING A WIREFRAME AND POLYGON VIRTUAL WORLD

Matter enclosed in heavy brackets [ ] appears in the original patent but forms no part of this reissue specification; matter printed in italics indicates the additions made by reissue.

This is a continuation of application Ser. No. 07/621,474 filed Nov. 30, 1990, now abandoned.

BACKGROUND OF THE INVENTION

This invention relates to virtual systems and, more particularly, to a method and apparatus for creating a virtual world from a database containing a limited pictorial representation of the virtual world.

Users of computer systems are now able to create virtual realities which they may view and interact with. One type of virtual reality system is disclosed in U.S. patent application Ser. No. 08/133,802, filed Oct. 8, 1993, which is a continuation of U.S. patent application Ser. No. 07/535,253, filed Jun. 7, 1990, now abandoned, entitled "Virtual Reality Network," the disclosure of which is incorporated herein by reference. One task which must be performed is the creation of the virtual worlds within which the users interact. This can be a very tedious task, since a complete description of all virtual objects in the virtual world, including their constraints of motion, hierarchy, color, texture and other attributes must be made and entered into the virtual reality computer. Thus, it would be desirable to make virtual world creation as simple as possible.

SUMMARY OF THE INVENTION

The present invention is a method and apparatus for creating virtual worlds wherein a user may begin with a database containing a limited pictorial representation of a desired virtual world and then edit the database to specify the remaining data needed to create the actual virtual world. In one embodiment of the present invention, a database containing a limited pictorial representation of a virtual world is communicated to a receiving unit, and a grouping unit collects various descriptions of the pictorial representation into selected groups. An attitude assigning unit then assigns attributes to the groups. The attributes may include group hierarchy, constraints of motion, color, texture or other features. The modified database is then communicated to a data coupling unit which couples real world data to the groups. Finally, a rendering unit renders the virtual world which looks and functions according to the specified attributes and the real world data.

BRIEF DESCRIPTION OF THE APPENDICES

Appendix 1 is a source code listing of a program used for creating a virtual world database according to the present invention;

Appendix 2 is a text description of the operation of the operation of the program entitled "Starch" listed in appendix 1;

Appendix 3 is a text description of the operation of the program entitled "Wringer" listed in Appendix 1; and Appendix 4 is a text description of the overall steps used to create a virtual world according to the present invention.

DESCRIPTION OF SPECIFIC EMBODIMENTS

1. Project Description

The Matis database conversion project enables the use of the Matis kitchen database in a virtual reality environment. To accomplish this, the Matis kitchen files are converted into the Isaac file format via RB2Swivel.

This conversion process has several steps. First, the Matis product files are edited, using the STARCH editor. The added editing information is stored in a GROUPING file which can be reloaded into the editor. Once the editing is complete, the product is converted into an RB2Swivel Script file. Once the products needed to construct a kitchen are in dm RB2Swivel format, the WRINGER program builds an RB2Swivel Script file containing the information necessary to make a virtual world. The RB2Swivel worlds are then loaded into Body Electric, along with the Body Electric Data Messagers (DMs) necessary to animate the word.

Figure 1:
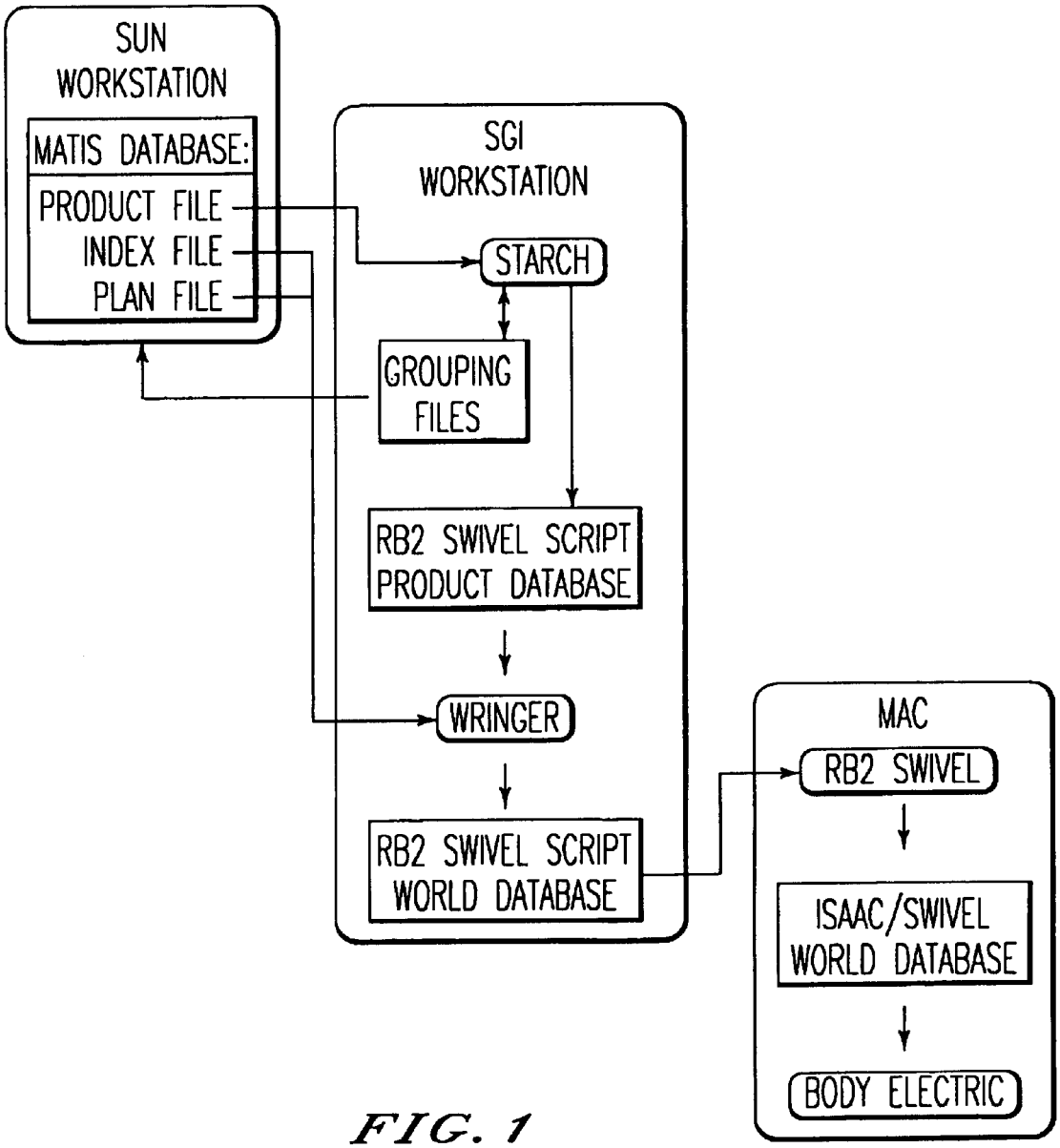
FIG. 1 is a block diagram of a particular embodiment of an apparatus for creating a virtual world according to the present invention.
Figure 2:
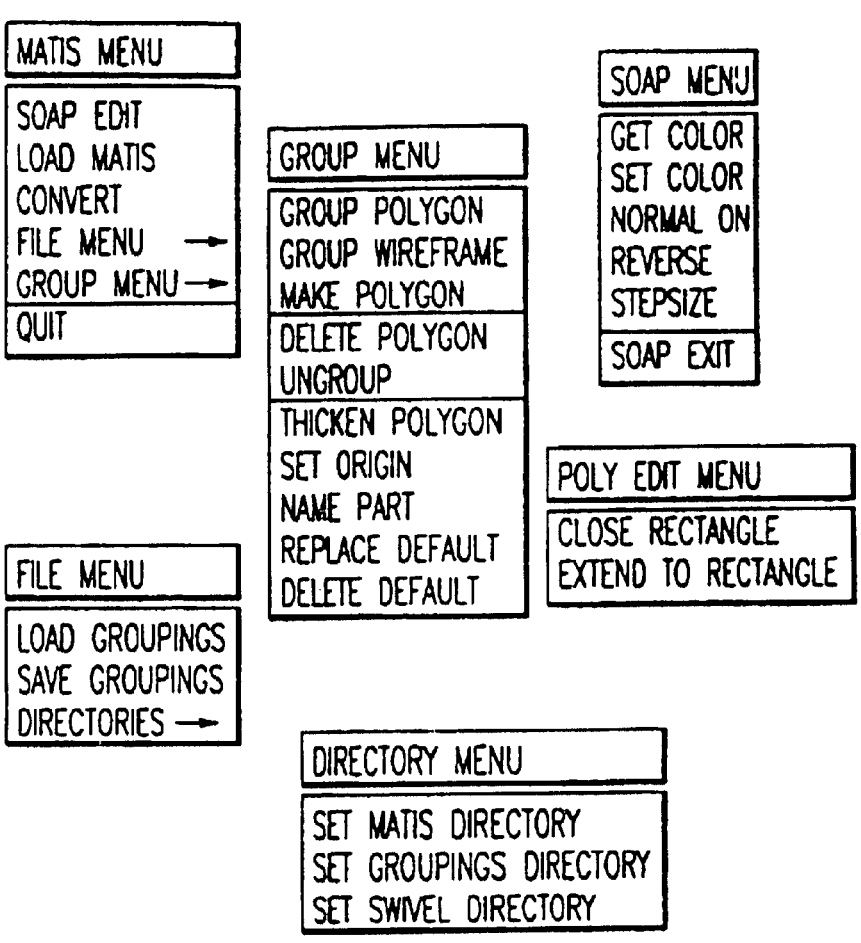
FIG. 2 is a series of menus used in a computer implementation of the present invention to control receiving pictorial representations of objects, grouping objects and assigning attributes to objects in a virtual world.
Figures 3A, 3B:
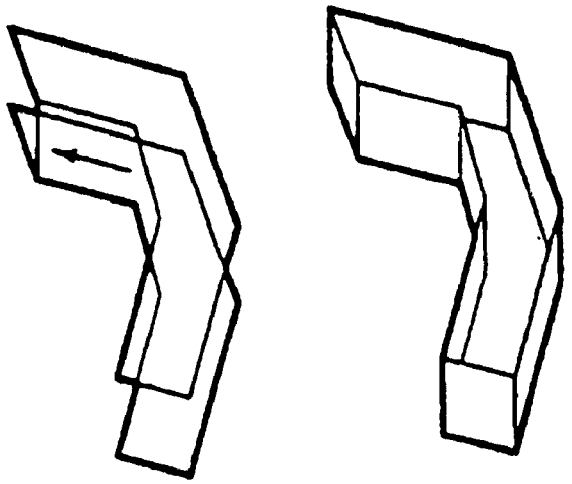
FIG. 3A is a pictorial representation of two objects and a single connecting edge (indicated by the arrow) that connects the two objects.
FIG. 3B is a grouped, sweep polygon object created from the pictorial representation of FIG. 3A after being grouped.

FIG. 1 shows a general outline of the conversion process. The GROUPING of the Matis database will be available for use on Sun Microsystems computers.

2. The STARCH Editor

This program runs on the SGI and enables the user to convert Matis product data into the GROUPING file data format. The final output format of the editor is RB2Swivel Script files. The GROUPING data file contains all the information necessary to edit a product from its last saved state. This information can also be used to speed the editing of similar products. Once editing is completed, the grouped Matis product data is converted temporarily to the SOAP data format. It is then converted to a Swivel Script file. There is one Swivel script file per product.

The editor provides file tools necessary for the grouping of matis graphic primitives into polygons or sweeps. Additional information such as constraints, thickness, and color can then be added.

2.1 Product Selection

The user needs to select which product to edit. This is accomplished by entering either the product number or name, or by cycling through the list of products of a kitchen as contained in the Matis planfile.

There is one GROUPING file per product. If a product which has already been edited is reselected for editing, the user is asked to confirm his intentions.

2.2 Default Parameter Addition

When a product is initially selected for conversion editing, default values for color, grouping, constraints, and thickness are added whenever possible.

Grouping defaults are a non-trivial problem. Currently, grouping is accomplish interactively. Future project phases may automate this process.

On completion of the grouping of graphic primitives into a part, a part name can be supplied by the user, or default to a predetermined value in order to establish constraint and thickness defaults.

Color, Thickness, and Constraint defaults are determined upon entry of a part name, such as door.

2.3 Product Editing

The grouping view also supports hierarchy editing. It displays an indented notation tree structure which specifies the Swivel linking constraints of the parts. The default relationship of the parts is a flat tree structure where every part is a child of the root (the product).

COLOR VIEW

This view displays the RGB color value of the current part.

The four functions which the editor must provide are the ability to group Matis graphic primitives and subprimitives into parts, edit product color information, determine physical constraints, and add part thickness. This is accomplished in a one screen editing environment consisting of 8 views:

MATIS GRAPHIC VIEW

This view displays the original Matis data as a 3-D rotatable wireframe object. This view is used for selection and feedback, but is not modifiable, except for the addition of user polygons and constraint origins.

MATIS TEXT VIEW

All of the graphic primitives which compose the product are displayed in this vie in a text list format. The association of text to graphics is accomplished through the use of color and highlighting. Primitives which can be subdivided into subprimitives have menu entries representing rite subprimitives.

Grouping Process

One or more primitives and subprimitives are selected. They are then grouped using the appropriate grouping menu item, at which time a part name can be supplied. This name then appears in the Grouping text view. When the one or more primitives and subprimitives are grouped, either a polygon or a wireframe part is generated as the result. If the definition of the polygon is not planar, it will be grouped as a sweep polygon automatically. A sweep polygon is defined by two sets of lines and arcs, each element in one set is parallel to a mirror image element in the other set, and the sets are connected by a single edge describing the thickness. Sweeps may also be created implicitly, as part of a thickened polygon.

Two objects in a virtual reality world may be assigned as connected hierarchically. The hierarchy is created by selecting an object and designating it as a child object of another object.

Objects additionally can be assigned as rotatable about a portion of another object. This is necessary only if the part is unconstrained in some way. For instance, a door needs to rotate about one of its edges. To define a rotational constraint of motion for an objects, the edge about which an object will rotate is selected. The origin will be set to the center of the edge if a line segment is selected, or the origin will be set to the center point of the defining endcap of a column if a column is selected. For example, to allow a faucet arm to swing side to side, an origin must be specified, and then the minimum and maximum constraint values must be set. Once an object or a grouped object has been designated as rotatable about an origin, a change in an angle of rotation will cause the selected object to rotate about the origin by the specified amount.

GROUPING TEXT VIEW

This view contains a list of the part names of the currently grouped parts. When one of the names is selected, the primitives which compose the part will become selected.

THICKNESS VIEW

This view consists of edited text items which enable thickness to be added to the currently selected part. The editable items are height and height type. The height is the measurement by which to thicken the selected part in the direction of its normal vector. The height type specifies whether the thickness is added to the positive direction, negative direction, or equally distributed.

CONSTRAINTS VIEW

This view displays positional and rotational constraints of the currently selected part. It displays the current, minimum, and maximum constraint values, as well as lock status.

CONVERSION (SOAP) VIEW

This view displays the most recently convened state of the product. The product is displayed in shaded, polygonal format.

COLOR GRID VIEW

This view displays a color grid from which to interactively specify a grouping's color. This view only appears in Soap Edit mode, as described in the Starch User's Manual, Section 4.4, and replaces the Matis Graphic View.

3. The WRINGER World Constructor

This module constructs a kitchen as determined by the Matis index and plan files. Its one interaction with the user is to select a particular kitchen to build. A master Swivel script file is output by this module and is ported to the Macintosh, and loaded into RB2Swivel.

3.1 Kitchen Selection

The user can input the index file entry number or the managing number as a command line argument when running the module. Wall, floor, and ceiling colors may also be specified by creating a "wringer.color" file. See the Wringer User's Manual for more details.

3.2 Making a World

The plan file referenced by the index fie entry is loaded.

A new RB2Swivel script file is then written. As each wall is created, its products are located upon it as specified by the plan file. The file includes a head and hand, and initial world orientation information.

4. Body Electric Interaction

DMs are defined for each type of movement that might be needed. They are then loaded by BE by indexing off the key part names in each product. This loading process occurs automatically when a world is loaded into BE.

What is claimed is:

1. An apparatus for creating a virtual world data base, comprising:

receiving means for receiving first, second and third polygon representations of respective first, second and third virtual objects in a virtual world;

selecting means, coupled to said receiving means, for selecting a first edge of said first virtual object and for selecting a second edge of said second virtual object; and grouping means, coupled to the receiving means and the selecting means, for grouping said first and second virtual objects in the virtual world into a grouped object comprising said first and second virtual objects joined at an intersection of the first and second edges, the grouped object represented by at least one of a three-dimensional and rotatable wireframe objects and a three-dimensional and rotatable sweep polygon.

2. The apparatus according to claim 1 further comprising attribute assigning means, coupled to the grouping means, for assigning an attribute to the first and second edges of the first and second virtual objects, the attribute means including hierarchy means for assigning a grouping hierarchy for the first and second virtual objects wherein the second virtual object is assigned as a child object of the first virtual object and wherein an orientation and a position of the child object is calculated relative to the first virtual object.

3. The apparatus according to claim 2 wherein the attribute assigning means further comprises:

origin assigning means for assigning an origin on the first virtual object around which the third virtual objects can rotate; and constraint assigning means for assigning a three-dimensional contraint of motion to the the third virtual object to constrain how the third virtual object can rotate with respect to the first virtual object.

4. The apparatus of claim 3, wherein the constraint assigning means comprises means for specifying a minimum angle and a maximum angle that said third virtual object can rotate with respect to said origin.

5. The apparatus according to claim 3 wherein the attribute assigning means further comprises color assigning means for assigning color values to the grouped object.

6. The apparatus according to claim 5 wherein the attribute assigning means further comprises texture assigning means for assigning texture values to the grouped object.

7. The apparatus according to claim 2 further comprising data coupling means, coupled to the grouping means, for coupling real world data to the grouped object.

8. An apparatus for creating a virtual world comprising:

receiving means for receiving first, second and third polygon representations of respective first, second and third virtual objects in a virtual world;

selecting means, coupled to said receiving means, for selecting a first edge of a first virtual object and for selecting a second edge of a second virtual object; and grouping means, coupled to the receiving means and the selecting means, for grouping said first and second virtual objects in the virtual world into a grouped object comprising said first and second virtual objects joined at an intersection of the first and second edges, the grouped object represented by at least one of a three-dimensional and rotatable wireframe object and a three-dimensional and rotatable sweep polygon;

attribute assigning means, coupled to the grouping means, for assigning an attribute to the first and second edges of the first and second virtual objects, the attribute assigning means including:

hierarchy means for assigning a grouping hierarchy for the first and second virtual objects wherein the second virtual object is assigned as as child object of the first virtual object and an orientation and a position of the child object is calculated relative to the first virtual object; and origin assigning means for assigning an origin on the first virtual objects around which the third virtual object can rotate; and constraint assigning means for assigning a three-dimensional constraint of motion to the the third virtual object to constrain how the third virtual object can rotate with respect to the first virtual object; and rendering means for rendering the virtual world including the grouped object.

9. The apparatus of claim 8, wherein the constraint assigning means comprises means for specifying a minimum angle and a maximum angle that said third virtual object can rotate with respect to said origin.

*10. A method for creating a data base representing a virtual world, the method comprising: receiving a plurality of polygon representations of virtual objects; selecting first and second virtual objects from said plurality of polygon representations of virtual objects; grouping the first and second virtual objects into a three-dimensional grouped object, wherein said grouping the first and second virtual objects includes: selecting a first edge of said first virtual object; selecting a second edge of said second virtual object; wherein said three-dimensional grouped object comprises said first and second virtual objects joined with at least a portion of said first edge of said first virtual object contacting at least a portion of said second edge of said second virtual object; assigning a grouping hierarchy for the first and second virtual objects, wherein the second virtual object is assigned as the child of the first virtual object; and calculating an orientation and position of the child object relative to the first virtual object.*

*11. A method for creating a data base representing a virtual world, the method comprising: receiving a plurality of polygon representations of virtual objects; selecting first and second virtual objects from said plurality of polygon representations of virtual objects; grouping the first and second virtual objects into a three-dimensional grouped object, wherein said grouping the first and second virtual objects includes: selecting a first edge of said first virtual object; selecting a second edge of said second virtual object; wherein said three-dimensional grouped object comprises said first and second virtual objects joined at an intersection of the first and second edges; assigning a grouping hierarchy for the first and second virtual objects, wherein the second virtual object is assigned as the child of the first virtual object; and calculating an orientation and position of the child object relative to the first virtual object.*

*12. A memory medium comprising program instructions for creating a data base representing a virtual world, wherein the program instructions are executable to implement: receiving a plurality of polygon representations of a plurality of virtual objects including a first virtual object, a second virtual object, and a third virtual object; selecting the first and second virtual objects from said plurality of polygon representations of virtual objects using edges of the virtual objects; grouping the first and second virtual objects into a three-dimensional grouped object represented by at least one of the following: a three-dimensional and rotatable wireframe object, and a three-dimensional and rotatable polygon object; wherein said grouping the first and second virtual objects includes: selecting a first edge of said first virtual object; selecting a second edge of said second virtual object; wherein said three-dimensional grouped object comprises said first and second virtual objects joined with at least a portion of said first edge of said first virtual object contacting at least a portion of said second edge of said second virtual object; assigning a grouping hierarchy for the first and second virtual objects, wherein the second virtual object is assigned as the child of the first virtual object; and calculating an orientation and position of the child object relative to the first virtual object.*

*13. A memory medium comprising program instructions for creating a data base representing a virtual world, wherein the program instructions are executable to implement: receiving a plurality of polygon representations of a plurality of virtual objects including a first virtual object, a second virtual object, and a third virtual object; selecting the first and second virtual objects from said plurality of polygon representations of virtual objects using edges of the virtual objects; grouping the first and second virtual objects*

*into a three-dimensional grouped object represented by at least one of the following: a three-dimensional and rotatable wireframe object, and a three-dimensional and rotatable polygon object; wherein said grouping the first and second virtual objects includes: selecting a first edge of said first virtual object; selecting a second edge of said second virtual object; wherein said three-dimensional grouped object comprises said first and second virtual objects joined at an intersection of the first and second edges; assigning a grouping hierarchy for the first and second virtual objects, wherein the second virtual object is assigned as the child of the first virtual object; and calculating an orientation and position of the child object relative to the first virtual object.*

*14. A system for creating a data base representing a virtual world, the system comprising: a computer system comprising a CPU and memory, wherein the memory stores a plurality of polygon representations of virtual objects; a user input device coupled to the computer system for providing user input to the computer system; wherein the CPU is operable to select first and second virtual objects from said plurality of polygon representations of virtual objects; wherein the CPU is operable to group the first and second virtual objects into a three-dimensional grouped object; wherein the CPU is further configured to: select a first edge of said first virtual object, and select a second edge of said second virtual object, wherein said three-dimensional grouped object comprises said first and second virtual objects joined with at least a portion of said first edge of said first virtual object contacting at least a portion of said second edge of said second virtual object, wherein the CPU is operable to assign a grouping hierarchy for the first and second virtual objects, wherein the second virtual object is assigned as the child of the first virtual object; and wherein the CPU is operable to calculate an orientation and position of the child object relative to the first virtual object.*

*15. A system for creating a data base representing a virtual world, the system comprising: a computer system comprising a CPU and memory, wherein the memory stores a plurality of polygon representations of virtual objects; a user input device coupled to the computer system for providing user input to the computer system; wherein the CPU is operable to select first and second virtual objects from said plurality of polygon representations of virtual objects; wherein the CPU is operable to group the first and second virtual objects into a three-dimensional grouped object; wherein said CPU is configured to group the first and second virtual objects by: selecting a first edge of said first virtual object, and selecting a second edge of said second virtual object, wherein said three-dimensional grouped object comprises said first and second virtual objects joined at an intersection of the first and second edges, wherein the CPU is operable to assign a grouping hierarchy for the first and second virtual objects, wherein the second virtual object is assigned as the child of the first virtual object; and wherein the CPU is operable to calculate an orientation and position of the child object relative to the first virtual object.*

*16. A method for creating a data base representing a virtual world, the method comprising:*

*receiving a plurality of polygon representations of virtual objects, wherein the plurality of polygon representations include a first, a second, and a third representation of respective first, second, and third virtual objects, wherein the virtual objects have edges;*

*selecting first and second virtual objects using the edges from said plurality of polygon representations of virtual objects;*

*grouping the first and second virtual objects into a grouped object comprising a combination of the first and second virtual objects, wherein the first and second virtual objects intersect; and*

*representing the gouped object by at least one of the following:*

*a three-dimensional and rotatable wireframe object, and*

*a three-dimensional and rotatable sweep polygon object.*

*17. The method as recited in claim 16, further comprising:*

*assigning a grouping hierarchy for the first and second virtual objects, wherein the second virtual object is assigned as the child of the first virtual object; and*

*calculating an orientation and position of the child object relative to the first virtual object.*

*18. The method as recited in claim 17, further comprising:*

*assigning group attributes to the grouped object; and*

*assigning individual attributes to a particular virtual object within the grouped object, wherein the individual attributes are inherited by child objects of the particular virtual object.*

*19. The method as recited in claim 17, further comprising:*

*assigning an origin on the first virtual object around which the second virtual object can rotate; and*

*assigning a three-dimensional constraint of motion to the second virtual object that constrains how the second virtual object can rotate with the respect to the first virtual object.*

*20. The method as recited in claim 19, further comprising specifying one or more angles that constrain the second virtual object's rotation with respect to the origin.*

*21. The method as recited in claim 19, further comprising specifying one or more constraint values that constrain the second virtual object's translation with respect to the origin.*

*22. The method as recited in claim 21, further comprising:*

*grouping a third virtual object into the grouped object; and*

*assigning a three-dimensional constraint of motion to the third virtual object that constrains how the third virtual object can rotate with respect to the origin.*

*23. The method as recited in claim 22, further comprising specifying one or more constraint angles that constrain the third virtual object's rotation with respect to the origin.*

*24. The method as recited in claim 17, further comprising assigning texture and color values to the grouped object.*

*25. The method as recited in claim 17, further comprising coupling real world data to the grouped object.*

*26. The method as recited in claim 25, wherein said coupling comprises:*

*taking sensor data from real world inputs; and*

*varying the orientation of the child object with respect to the origin in relation to the sensor data.*

*27. The method as recited in claim 25, wherein said coupling comprises:*

*taking sensor data from real world inputs; and*

*varying the position of the child object with respect to the origin in relation to the sensor data.*

*28. The method as recited in claim 25, wherein said coupling comprises:*

*sensing the relative position of two real world physical objects; and*

*adjusting the relative position of the second virtual object relative to the origin accordingly.*

*29. The method as recited in claim 25, wherein said coupling comprises:*

*sensing the relative orientation of two real world physical objects; and*

*adjusting the relative orientation of the second virtual object relative to the origin accordingly.*

*30. The method as recited in claim 29, wherein said sensing is accomplished using a data glove.*

*31. A computer program for creating a virtual world data base, wherein said computer program is embodied on computer-readable media and comprises instructions configured to:*

*read polygon representations of a plurality of virtual objects, including a first virtual object, a second virtual object, and a third virtual object;*

*select the first virtual object and the second virtual object from said plurality of virtual objects;*

*assign attributes to the first and second virtual objects;*

*group said first and second virtual objects into a grouped object, wherein said first and second virtual objects intersect;*

*represent the grouped object by at least one of the following:*

*a three-dimensional and rotatable wireframe object, and*

*a three-dimensional and rotatable polygon object;*

*assign a grouping hierarchy to the first and second virtual objects, wherein the second virtual object is assigned as the child of the first virtual object; and*

*calculate an orientation and position of the child object relative to the first virtual object.*

*32. The computer program as recited in claim 31, wherein said computer program further comprises instructions configured to:*

*assign an origin on the first virtual object around which the second virtual object can rotate; and*

*assign a three-dimensional constraint of motion to the second virtual object, wherein said three-dimensional constraint of motion constrains how the second virtual object can rotate with respect to the first virtual object.*

*33. The computer program as recited in claim 31, wherein said computer program further comprises instructions configured to specify a minimum angle and a maximum angle that the third virtual object can rotate with respect to the origin.*

*34. The computer program as recited in claim 31, wherein said computer program further comprises instructions configured to assign color values to the grouped object.*

*35. The computer program as recited in claim 31, wherein said computer program further comprises instructions configured to assign texture values to the grouped object.*

*36. The computer program as recited in claim 31, wherein said computer program further comprises instructions configured to couple real world data to the grouped object.*

*37. The computer program as recited in claim 36, wherein said computer program is configured to:*

*take sensor data from real world inputs; and*

*vary the orientation of the child object with respect to the origin in relation to the sensor data.*

*38. The computer program as recited in claim 36, wherein said computer program is configured to:*

*take sensor data from real world inputs; and*

*vary the position of the child object with respect to the origin in relation to the sensor data.*

*39. The computer program as recited in claim 36, wherein said computer program is configured to:*

*sense the relative position of two real world physical objects; and*

*adjust the relative position of the second virtual object relative to the origin accordingly.*

*40. The computer program as recited in claim 36, wherein said computer program is configured to:*

*sense the relative orientation of two real world physical objects; and*

*adjust the relative orientation of the second virtual object relative to the origin accordingly.*

*41. The computer program as recited in claim 40, wherein said computer program is configured to sense the relative orientation of two real world objects from input signals received from a data glove.*

*42. A computer program embodied on a computer-readable medium, wherein the computer program is configured to create a data base representing a virtual world by: receiving a plurality of polygon representations of virtual objects; selecting first and second virtual obhects from said plurality of polygon representations of virtual objects; grouping the first and second virtual objects into a hierarchical grouped object, wherein said grouping includes: selecting a first mathematical edge of said first virtualobject; selecting a second mathematical edge of said second virtual object; and representing the grouped object by at least one of the following: a three-dimensional and rotatable hierarchical wireframe object, and a three-dimensional and rotatable hierarchical polygon object and wherein the first and second virtual objects intersect, and wherein the grouped object comprises said first and second virtual objects joined with at least a portion of said first edge of said first virtual object contacting at least a portion of said second edge of said second virtual object.*

* * * * *